Patented Apr. 9, 1929.

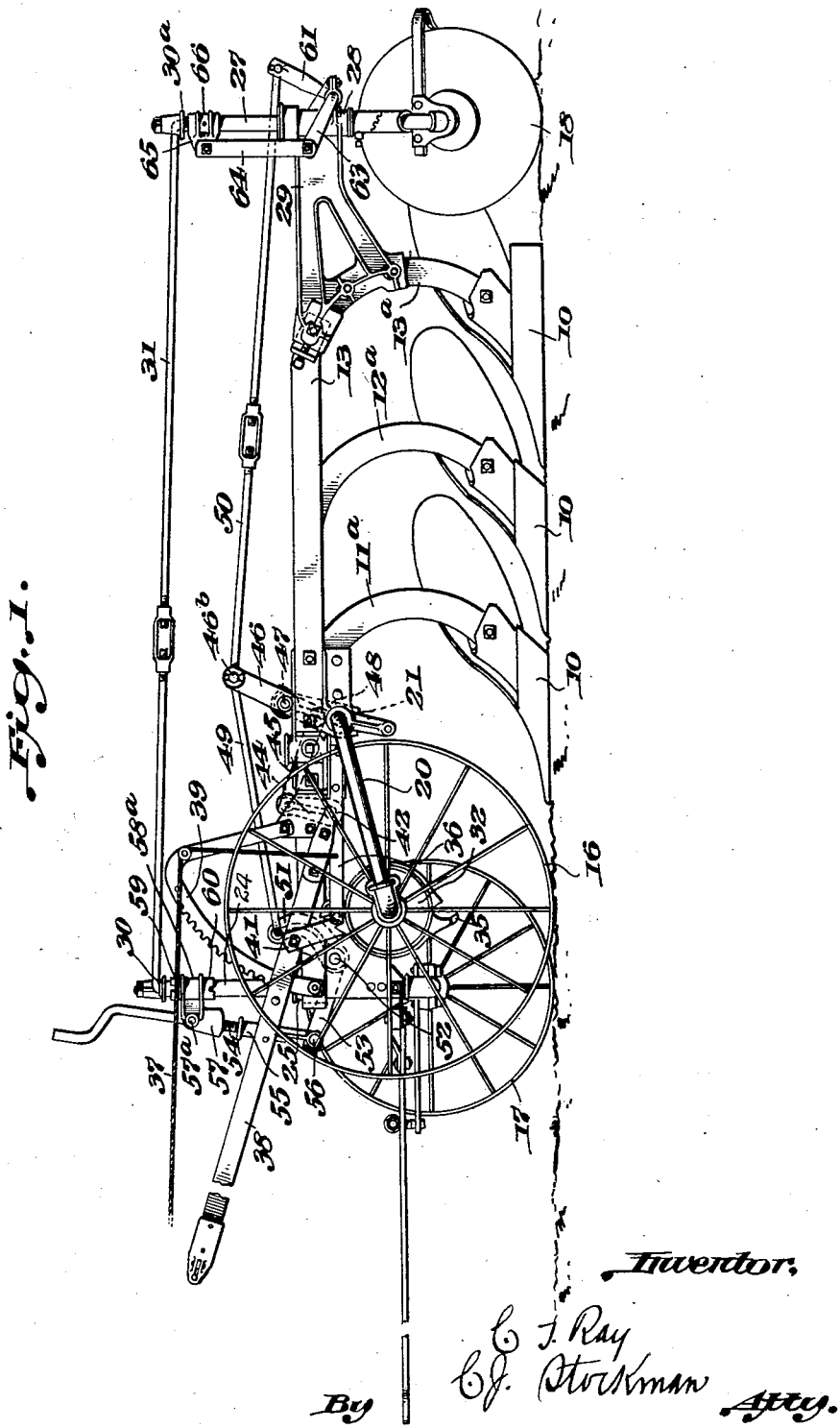

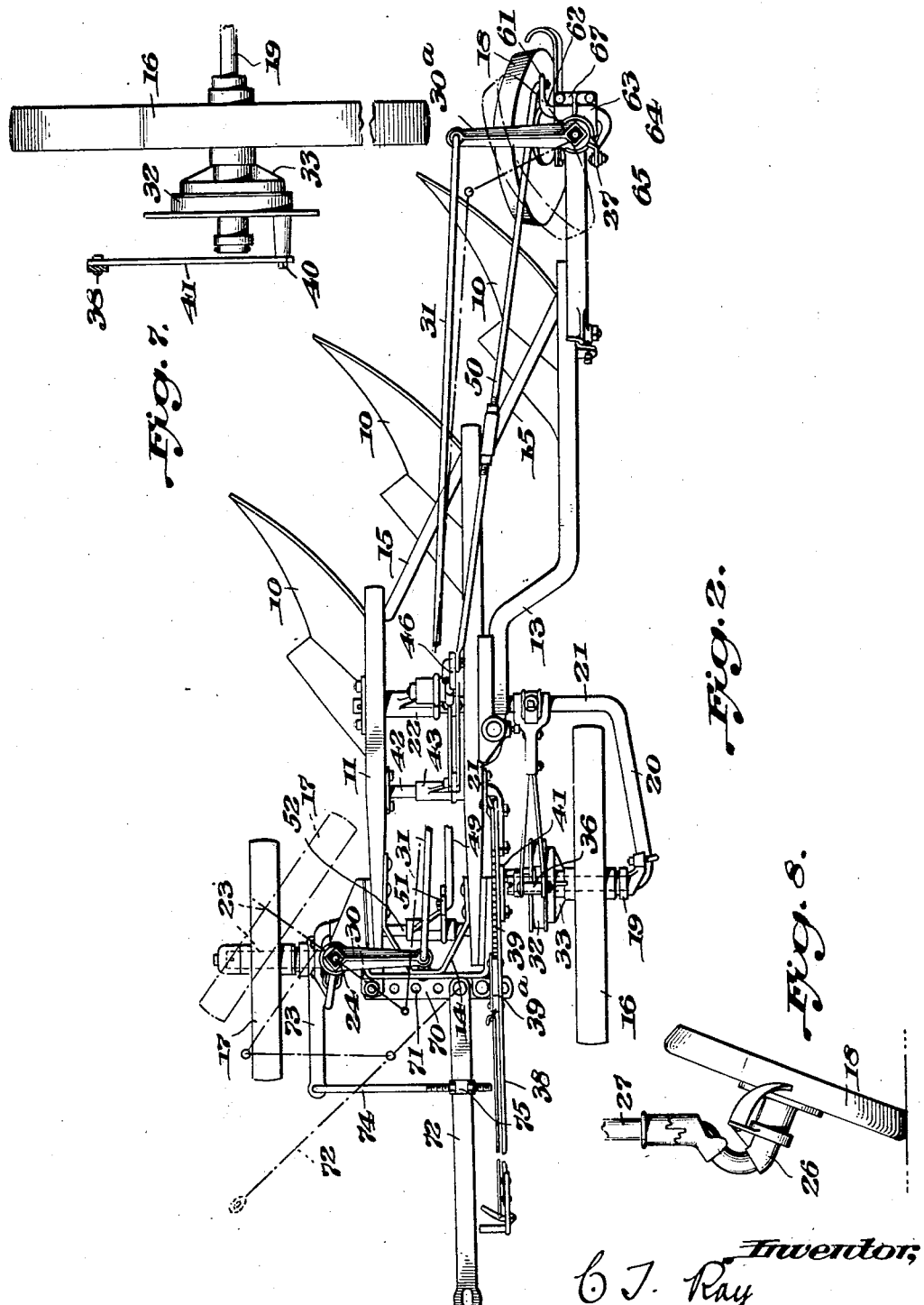

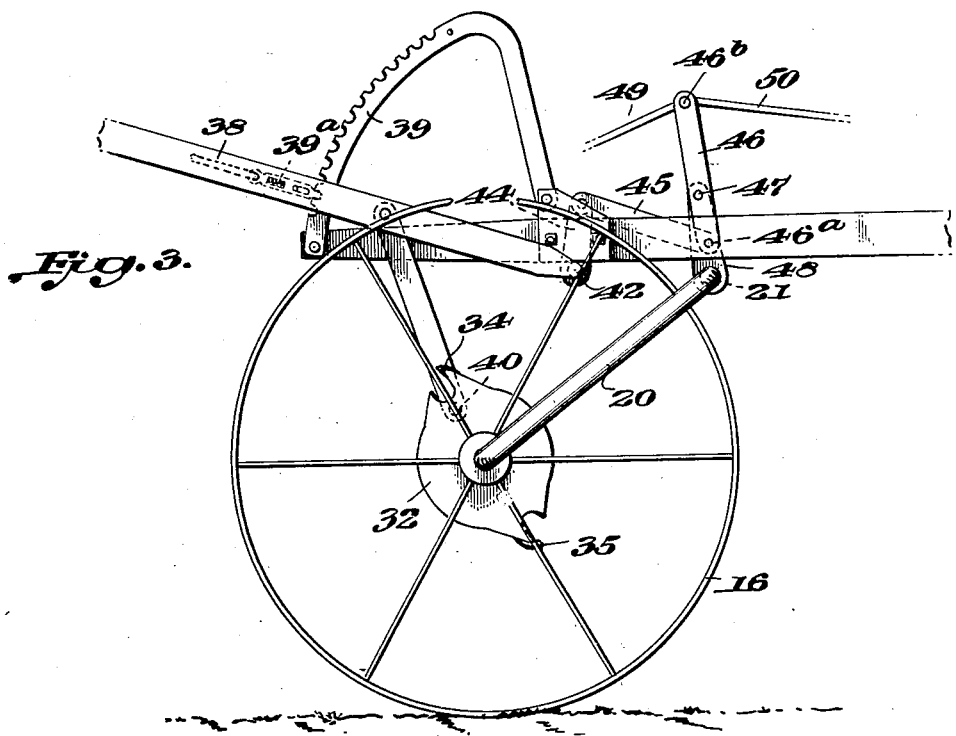
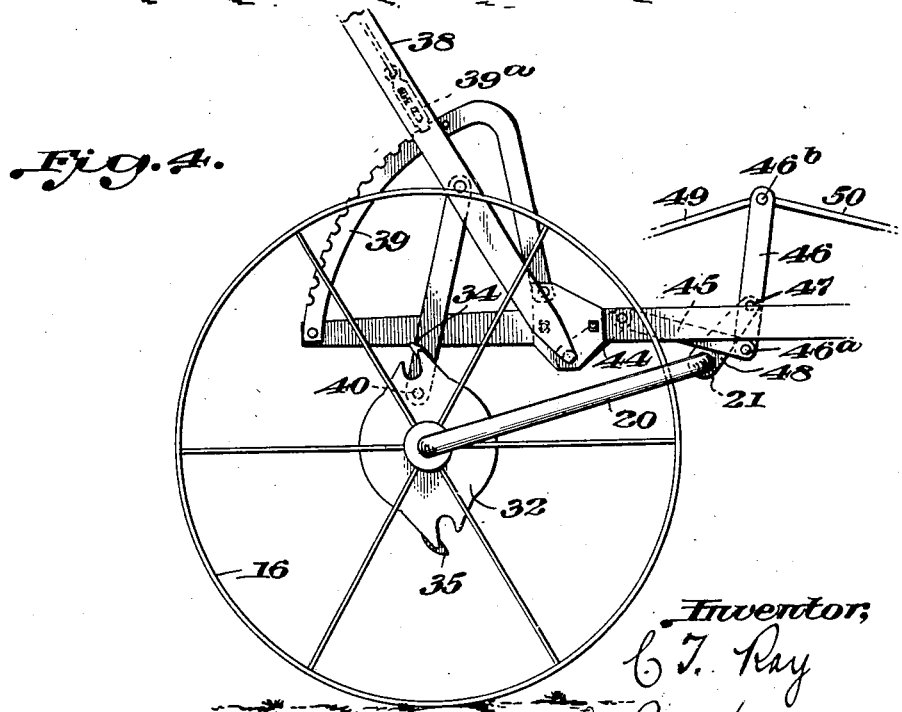

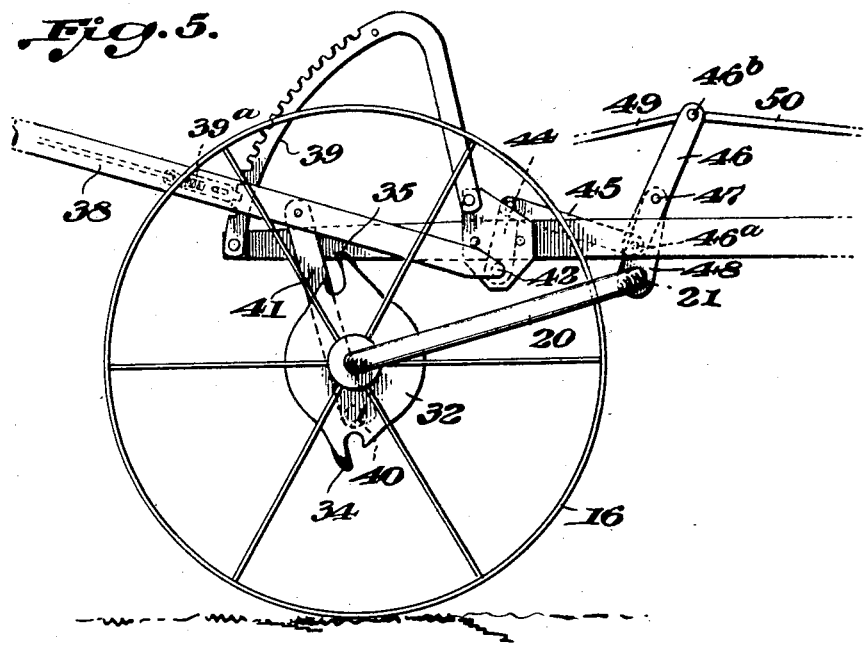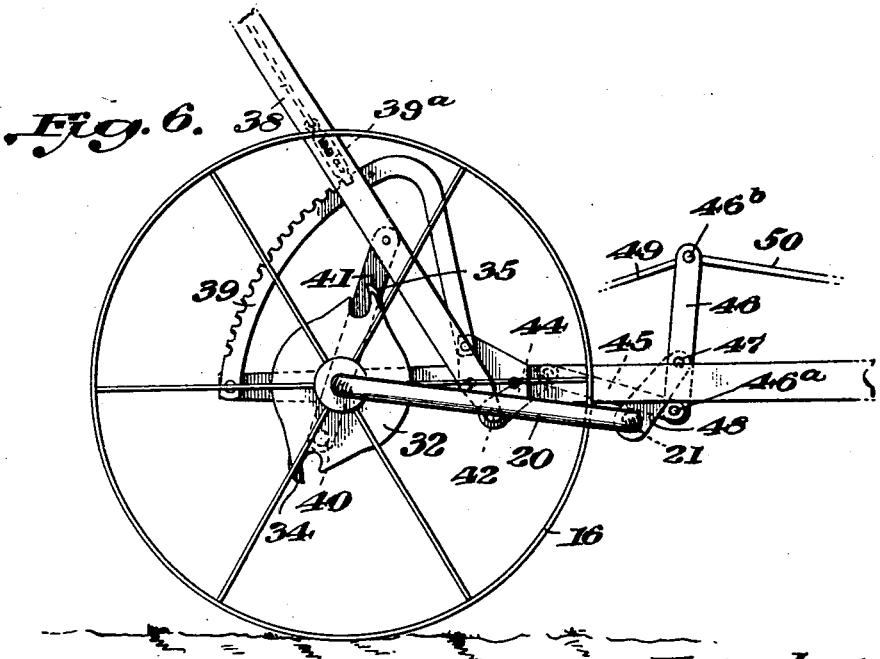

1,708,633

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

TILLAGE IMPLEMENT.

Application filed September 6, 1921. Serial No. 498,694.

This invention particularly relates to tractor-drawn plowing implements including mechanism controlled by an operator on the tractor and having definite cycles of movement derived from the forward travel of the implement, in one of which cycles of its movement the frame and the plowing members carried by the frame are lowered from a non-working position to a working position and in the next cycle of the said movement are raised from the working position to the non-working position. Implements of the kind referred to have also included means by which the soil working members may be adjusted by an operative to variably determine their depth of penetration into the ground as is necessary in order that furrows of different depths may be selectively produced.

Under date of December 15, 1919, I filed in the United States Patent Office an application which has matured into Patent Number 1,606,132 dated November 11, 1926, and under date of September 6, 1922, I filed in the United States Patent Office an application which has matured into Patent Number 1,643,519 dated September 27, 1927. The applications for these patents were pending concurrently with the instant application and set forth plowing implements of the kind hereinabove referred to. The implements embodied in my aforesaid applications contain certain elements and combinations of elements which I prefer to use in the mechanism upon which the instant application for patent is based. The mechanism constituting the present invention differs from those set forth in my aforesaid applications in certain substantial respects among which may be mentioned:—

(1) A correlation of parts by which opposite sides of the implement are supported, the depth of furrow is adjusted by correspondingly adjusting one side of the implement relatively to the other through the operation of a depth controlling member, and both sides of the implement are raised simultaneously or lowered simultaneously through the medium of power mechanism;

(2) One side of the implement is supported by furrow wheels mounted upon the lower ends of substantially vertical shafts and the other side of the implement is supported by a land wheel mounted upon the lower end of a crank axle, which axle is rocked in one direction by one cycle of the movement of the power means and is rocked in the other direction in the next cycle of the movement of the power means and is connected with both furrow wheel shafts by means of a somewhat particular nature for raising both furrow wheel shafts simultaneously when the land wheel axle is rocked in one direction and for lowering them simultaneously when the land wheel axle is rocked in the other direction.

The two respects which characterize the instant invention may be several, that is, they are not essentially inter-related and need not be embodied in the one implement and hence it is not my purpose to confine the scope of the protection, considered in its broadest aspects, to an implement having both of said characteristic features. As a matter of fact, however, I find that an implement having the features referred to has marked advantages and the mechanism which I have devised is of such nature that its elements are so correlated as to embody both of said features and in a most practicable way. In a general way, it may be stated that this mechanism includes a member having a changeable fulcrum about one of which it is moved under control of a depth adjusting lever to cause one side of the implement to be adjusted relatively to the other and about the other of which it is moved under control of the power mechanism to cause both sides of the implement to be moved at once. Other features embodied in the illustrated mechanism will be apparent from the following description.

It should be understood that while the drawings illustrate what I consider to be the best embodiment of my invention and while I shall minutely describe said embodiment, yet I am aware that changes may be made in details and salient features of the invention may be otherwise and variously embodied without departing from the spirit of the invention as defined by the scope of the appended claims.

In the said drawings wherein like characters of reference are applied to similar parts in the several views:—

Fig. 1 is a side elevation of an implement embodying my improvements.

Fig. 2 is a plan view of the same.

Fig. 3 is a detail view particularly intended to show the relative positions of elements of the raising and lowering mechanism when set for a shallow furrow, with the frame in transport position.

Fig. 4 is a like view showing the relative positions of the elements when set for a deep furrow with the frame in transport position.

Fig. 5 is a similar view, showing the relative positions of the parts when adjusted for a shallow furrow with the frame in working position.

Fig. 6 is a similar view, showing the relative position of the parts when set for a deep furrow with the frame in working position.

Fig. 7 is a detail view showing, in front elevation, the means connecting the land wheel with the lever which adjusts the mechanism for different depths of furrow; and Fig. 8 is a detail view of the rear furrow wheel and a part of its axle.

The drawings exemplify the invention as embodied in a plowing implement having three soil turning members 10 of the moldboard type, but the number of said turning members may be varied and they may be of a different type from that illustrated—including disks—without departing from the spirit of the invention as defined by appended claims.

The frame may be of any construction suitable to the number and type of soil turning members employed. The illustrated frame comprises three beams 11, 12 and 13 connected at the front by a member 14 and at the rear by members 15 to form a strong and rigid structure, and extending at the rear to different vertical planes so that the members 10, which are carried by the downwardly curved rear ends 11ª, 12ª and 13ª of the beams, respectively, will be arranged diagonally with relation to the frame, or in successively off-set relations.

The frame and soil turning members are carried by a land wheel 16, a front furrow wheel 17 and a rear furrow wheel 18. The land wheel, 16, is rotatably mounted on the inwardly extending end or spindle 19 of a crank axle, which comprises a crank member 20 extending rearwardly from said spindle 19, and a journal member 21 extending across the frame and rotatable upon a horizontal axis in a bearing 22 carried by the frame. The forward furrow wheel 17 is rotatably mounted upon a spindle 23 extending suitably from the lower end of a shaft or axle 24, which is mounted to rotate upon a vertical axis in a suitable bearing 25 secured to the frame. The rear furrow wheel 18 is rotatably mounted on a spindle 26 inwardly inclined from the lower end of a shaft or axle 27 which is mounted to rotate upon a vertical axis in a bearing 28 carried by a bracket 29 secured to the downwardly extending end 13ª of the beam 13. The upper ends of the vertical axles 24 and 27 are provided with cranks 30 and 30ª connected with each other by a link 31 whereby guiding movement is transmitted from the forward axle 24 to the rear axle 27.

The illustrated means for raising the frame and soil working members from working position to transport position and for lowering them from transport position to working position includes a clutch having a driven member 32 and a driving member 33. This clutch is preferably of the construction fully set forth in my before mentioned Patent Number 1,606,132 to which reference may be had for a full understanding thereof.

Attention, however, is directed to the fact that in the present implement the driven member 32 is mounted upon the spindle 19 of the land wheel axle, instead of upon the forward furrow wheel axle, the driving member being in such case formed as a part of the hub of the land wheel 16, instead of the hub of the forward furrow wheel. The driven member of the clutch is provided with arms 34, 35, controlling a dog or pawl, not shown, which constitutes the element through which the driven member is operatively connected to the driving member, and these arms are normally held in position which holds the pawl out of engagement with the driving member by a pivoted latch 36 which is operated by a cord 37, (Fig. 1) or other suitable operating element, extending to within convenient reach of the operator on the tractor to release the arm with which it is engaged, when it is desired to raise or lower the frame and soil working members, all as in my said patent. This clutch is of a nature such that the frame and soil working members are lowered from transport position to working position, or raised from working position to transport position, as the case may be, while the land wheel is making one-half of a full revolution, during which time the latch is held out of engagement with the corresponding arm 34, 35 and is then automatically engaged with the other dog or pawl to thereby disengage the pawl from the driving member and hence free the driven member from the driving member.

The driven member of the clutch is connected to the frame by means which cause the crank axle, (by which the driven member is carried and upon which the driving member and land wheel are mounted) to swing forward or rearward in the operation of changing the height of the frame and soil turning members with relation to the ground, and the connections between the driven member of the clutch and frame include an adjusting lever, 38, which is operable to variably adjust the depth of plowing and is held in any one of a number of different positions, for said purpose, by a quadrant 39. In the present embodiment, I have shown a connection between the lever and driven member 32, which comprises a pin or lug 40 extending from said driven member and a link 41 extending from said lug to the lever 38.

One of the important purposes of the present invention is, as hereinbefore suggested, to provide means (adapted to a plowing implement having a power lift mechanism operated by the land wheel as distinguished from a furrow wheel) whereby the frame and soil working members may be set for any one of a plurality of different depths of furrow but will be returned to their normal transport position regardless of the depth to which they were adjusted for working purposes. The means herein exemplified for the accomplishment of this very important purpose is as follows:—

The rear end of the lever 38 is fixedly secured to a transverse shaft 42 to which there is also fixed a sleeve 43 having a crank 44 connected by a link 45 to the lower end of a lever 46 which is pivoted intermediate its length, at 47, to a crank 48 fixedly connected to the member 21 of the crank axle. The pivotal connection of the link 45 to the lever 46 is marked 46ª.

The upper end of the lever 46 is pivoted at 46ᵇ to the confronting ends of two members, as the longitudinally movable rods 49 and 50, which are connected with the vertical shafts 24 carried by the front and rear furrow wheels, respectively, by means of such nature that relative up and down movement between the frame and said shafts will take place when the upper end of the member 46 is swung forward or rearward. The particular exemplified connections between the rod 49 and the vertical shaft 24 of the forward furrow wheel, includes a bell crank lever formed by a crank 51 to which the forward end of the rod 49 is connected, a shaft 52 which is journaled in the frame and to which the lower end of the crank 51 is attached and a second crank 53, also attached to the shaft and extending forward therefrom. The crank 53 is connected with the shaft 24 preferably by means identical with that set forth in the companion application, which has since matured into Patent Number 1,643,519, hereinbefore referred to, to which reference may be had for a fuller understanding. It is sufficient in this application to state that it includes a rod 54 which for purposes additional to its function of forming an element of a practical connection between the crank 53 and shaft 24, is threaded within a sleeve 55 whose lower end is pivoted at 56 to the crank 53, said rod also extending through a member 57 which is pivoted at 57ª to a bracket 58, the rear end of which bracket forms a collar 58ª through which the shaft 24 extends. Relative rotative movement of the collar 58ª and shaft 24 is permitted, but relative up and down movements are prevented by collars 59 and 60 which are fastened to the shaft and are arranged, respectively, above and below the collar 58ª.

In the illustrated embodiment of the invention, the longitudinally movable rod 50 has its rear end connected to a crank 61 extending from one end of a shaft 62 whose other end is provided with a second crank, 63, extending forward therefrom and connected, by a link 64, to a bracket 65 in which the vertical shaft 27 of the rear furrow wheel is rotatably mounted. A collar 66, fixed upon the shaft 27 and mounted in a recess formed in the rear end of the bracket, engages the upper and lower walls of said recess. The shaft 62 is journaled in a bracket 67 secured to the rear end of the frame and said shaft, together with the cranks 61 and 63 forms a bell crank lever one arm of which is connected to the rod 50 and the other arm of which has connection with the shaft 27 in such manner as to cause relative up and down movement between said shaft and the frame, when the rod 50 is moved longitudinally, while permitting the shaft 27 to turn within the collar 66.

It will be understood that the rotative movement of the shafts 24 and 27 within the collars 58ª and 66, respectively, is for the purpose of guiding the implement and that said parts rotate simultaneously when rotative movement is imparted to shaft 24, by reason of the connection formed by the cranks 30 and 30ª and rod 31. As a means for rotating the shaft 24, there is provided at the forward end of the frame, a transverse bar 70 having a series of openings 71 through any one of which the rear end of a draft bar 72 may be connected. The lower end of the shaft 24 is provided with a crank 73, which is arranged substantially at right angles with relation to the crank 30 and is connected with the draft bar 72 by a rod 74 having a portion threaded in a nut 75 trunnioned upon the draft bar. This means permits lateral adjustment of the draft bar to accommodate different hitching points on different tractors.

When the frame and soil working members are in transport position, the parts are arranged as follows:

The lower surfaces of all the wheels are in substantially the same horizontal plane, assuming, of course, that the ground is substantially level; the driven member 32 of the clutch is in the position in which its pin 40 is at its highest point of travel (Figs. 3 and 4); the latch 36 is engaged with the arm 34 and acts to hold the pawl (not shown) in the driven member of the clutch out of engagement with the driving member of the clutch; the lever 38 is locked to the quadrant 39 (by dog 39ª) at the particular notch corresponding to the depth of furrow to be produced.

If a furrow of minimum depth is to be produced, the lever 38 is locked to the quadrant at the lowest notch of the quadrant (Fig. 3) and when the lever is in this position, the frame and the lower surfaces of the plow bodies occupy substantially horizontal positions, that is to say the frame is level and the lower surfaces of the plow bodies are in a plane substantially parallel with the plane of the lower surfaces of the several supporting wheels.

If, however, a furrow of greater depth than the minimum is to be produced (see Fig. 4), the operator raises the outer end of the lever 38 a distance corresponding to the depth of furrow to be made and then locks it to the quadrant 39 at the selected place on said quadrant. This movement of the lever 38 applies force to the lower end of the lever 46, at the point 46ª, causing said lever to swing about its upper fulcrum at 46ᵇ (which remains stationary) and to apply power in a rearward direction to the upper end of the crank 48, at the point 47, to turn the journal portion 21 of the crank axle in its bearing on the frame and hence change the angle of the crank portion 20 of the land wheel axle relatively to the frame, the land wheel correspondingly moving forward and upward. It will be noted that in the operation referred to, the driven member 32 of the clutch has not been turned about its axis on the spindle of the land wheel axle nor has any movement been imparted to the rods 49, 50 which control the vertical movements of the furrow wheels. The movement of the crank axle, however, has allowed the landside side of the frame to correspondingly approach the ground and when the movement of the lever 38 has been completed and it is again locked to the segment 39, the landside side of the frame has been lowered, without correspondingly lowering the furrow side thereof and without changing the travel of any of the parts which control the vertical distance traversed by the frame in its movement from transport to working position. The plow bodies are fixedly attached to the frame so that the movement of the landside side of the latter toward the ground without similar movement of the furrow side toward the ground, has brought their points nearer to the ground without lowering them bodily. This lowering of the points of the plow bodies, raises the rear of the mold board and gives the land side a closer position to the ground while the plow bodies are still in the non-tilling position and above the ground. Since the operation of the clutch lowers the land side a substantially constant distance, the total drop of the land side equals the initial drop caused by the setting of the depth control lever plus the drop caused by the lowering of the land side when the clutch is operated. The operation of the clutch and subsequent forward travel causes a dropping of the plow bodies and a raising of the furrow wheels until all are in the same plane and as the machine advances, the plow bodies and furrow wheels go below the surface of the unplowed land until the aforesaid plane is parallel to the surface of the land being plowed.

When the adjustment has been thus made the frame and plow bodies are lowered bodily from transport non-plowing position by power derived from the land wheel as follows:—

The operator upon the tractor after the implement has been set in motion pulls upon the cord 37 thus disengaging the latch 36 from the arm 34, thereby permitting the pawl (not shown) in the driven member 32 of the clutch to be forced into engagement with the driving member of the clutch. The driven member of the clutch is now caused to make one-half of a complete revolution with the land wheel 16 and is then automatically released from the driving member by the engagement of the latch 36 with the arm 35. During this movement, the pin or lug 40 projecting from the clutch member 32 travels from its highest to its lowest position (it being remembered that it is always in its highest position when the implement is in transport position, regardless of any adjustment made for depth of furrow) thus permitting the landside side of the frame to lower, the journal portion 21 of the land wheel axle turning rearward in its bearing upon the frame and the landwheel moving forward relatively to the frame while the landside side is being lowered. The axial movement of the journal portion 21 of the landwheel axle causes its crank 48 to apply force to the lever 46 at the point 47 thereby causing said lever to turn about its lower fulcrum, at 46ª (held stationary by the locked hand lever 38), thus causing the upper end of the lever to travel rearward and to act, through the arms 49 and 50 and the described connections between said arms and the furrow wheels, to raise the furrow wheels and thereby lower the furrow side of the frame simultaneously with the lowering of the frame at the landside side, thus lowering the frame and bodies bodily.

If a furrow of minimum depth is to be produced, the lever 38 is locked to the lowest notch of the quadrant 39, and when the lever is in this position the frame and the lower surfaces of the plow bodies occupy substantially horizontal positions. It may be mentioned here that the depth of furrow is regulated by changing the angles of the lower surfaces of the supporting frame and soil turning members relatively to the points of contact of the implement supporting members (land and furrow wheels, as here illustrated) with the ground while said members are in transport position, it being understood that, if the lower surfaces of the frame and soil turning members be inclined with relation to the points of contact of the implement supporting members with the land, a deeper cut will be produced than if the bottoms of the plow bodies were more nearly horizontal due to the fact that the plow bodies will keep cutting deeper into the ground until the bottoms of the plow bodies are caused to reach a substantially horizontal position on account of the travel of the land wheel on the surface of the ground.

When the parts are moving from transport to working position, or vice versa, under the power of the land wheel, the land and furrow wheel mountings, consisting of the spindles which are carried, respectively, by the crank axle and the upright axle or shaft 24, move toward or from the plane of the frame which supports the soil working bits or members, and this motion is caused by the reversal of the operated clutch member 32 through the thrust link 41 which has an eccentric connection with the clutch member and a swinging or pendulous connection with the lever 38, which latter, being locked at the desired adjustment, in effect forms a part of the frame. Hence, as the lower fulcrum point 46ᵃ is held fixed by link 45, the swinging movement of the crank 48, carried by the crank axle causes a swinging movement of the upper end of lever 46 and transmission of vertical movement to the front and rear furrow wheel mountings. Whereas, when the hand lever 38 is adjusted to vary the furrow depth position of the landside of the frame the fulcrum of the lever 46 is at its upper end, 46ᵇ, and the lower end swings to move crank 48 and hence the crank axle to adjust the land wheel mounting.

It should also be noted that the landside member of the soil working bits is located in the longitudinal plane of and in trailing or tracking relation with the land wheel to maximize the effect of the landside adjustment of the frame in determining the furrow depth, and to provide for this relative transverse compactness of arrangement the arm 20 of the crank axle is arranged inside or landward of the plane of the wheel and the beam 13 of the land side bit is offset landward in rear of the land side wheel.

The forward furrow wheel follows the last furrow formed in the previous travel of the machine, as the rear furrow wheel follows the furrow formed by the landward soil working member, and due to the arrangement above noted the adjustment by means of the hand lever 38 substantially controls the furrow depth without altering the relations of the elements which cooperate in what for convenience may be termed the "transposition movement" from working to transport and from transport to working position under the actuation of the land wheel.

An important agency in permitting this independence of furrow depth adjustment and transposition movement is the element represented in the present embodiment of the invention by the changeable fulcra lever 46, wherein the mounting in relation to the means for effecting said independent movement is such that its fulcrum or axis of swinging or oscillation is transferred from one end to the other according to whether it serves to move the crank axle to vary the furrow depth or serves to communicate vertical shifting movement to the furrow wheels.

Moreover, it will be obvious that whereas the furrow-depth adjusting movement of the land wheel varies the position with relation to a transverse vertical plane of the major diameter of the driven clutch member and hence varies the path of the pin 40 to which the thrust link or pitman bar 41 is connected and therefore the vertical distance through which said pin travels and the frame moves in the "transposition movement", this variation is compensated for by the shifting or readjustment of the rocking transmission element represented by the changeable fulcra lever 46 due to variations in the adjustment of the lever 38 which controls the furrow depth positioning of the soil working members to insure at all furrow depth adjustments a substantially uniform proportionate extent of transposition movement.

Having described my invention what I claim is:

1. In a tillage implement, soil working means, supporting means therefor, a lever mechanism capable of changeable fulcra, an adjustable member adapted to operate said lever mechanism on one fulcra to vary the depth of penetration of the soil working means and power means to operate the lever mechanism on its other fulcra to raise or lower the soil working means from or into soil working position.

2. In a tillage implement, a frame, soil working means, a supporting wheel for one side of the frame, supporting wheels for the other side of the frame, a lever mechanism having connection with the wheels and capable of changeable fulcra, an adjustable member to operate said lever mechanism about one of its fulcra to determine the depth of penetration of the soil working means and means operated by power derived from rotation of one of the supporting wheels to operate the lever mechanism about its other fulcra to raise or lower the soil working means from or into soil working position.

3. In a tillage implement, a frame, soil working means, a supporting wheel for one side of the frame, supporting wheels for the other side of the frame, connections between the wheels at opposite sides of the frame, including a member having changeable fulcra, an adjustable member operatively related to said changeable fulcra member to swing the same about one of its fulcrums to vary the depth of penetration of the soil working means, and means operated by power derived from one of the supporting wheels and operatively related to said changeable fulcra member to cause pivotal movement thereof about its other fulcrum to raise or lower the soil working means from or into soil working position.

4. In a tillage implement, a frame, supporting means for opposite sides thereof, respectively movable relatively thereto to raise and lower the same, soil working means, an adjustable depth regulating member, a lever mechanism including a member having changeable fulcra and also including connections between one of the fulcrum points of said member and the supporting means of one side of the frame and a separate connection between the other fulcrum point of said member and the adjustable depth regulating member, to cause said member to swing about the first named fulcrum when the depth regulating member is adjusted, and a connection between the supporting means of the other side of the frame and the changeable fulcra member operative to swing said member about its said other fulcrum.

5. In a tillage implement, a frame, means to support one side thereof, means to support the other side thereof, soil working means, an adjustable depth regulating member, a lever mechanism including a member having changeable fulcra and also including connections between one of the fulcrum points of said member and the supporting means of one side of the frame and a connection between an intermediate point of the lever and the supporting means of the other side of the frame and a connection between the other fulcrum point of the lever and the adjustable depth regulating member, to cause movement of the changeable fulcra member about its first named fulcrum, and a power means operatively related to said changeable fulcra member to cause movement of the latter about its other fulcrum.

6. In a tillage implement, a frame, a crank axle and its carrying wheel supporting one side of the frame, carrying wheels and their supports movable relatively to the frame and supporting opposite ends of the frame at the other side thereof, soil working means, an adjustable depth regulating member, a lever mechanism including a member having changeable fulcra and also including operating connections between one of the fulcrum points of said member and said wheel supports at opposite ends of one side of the frame and operating connection between the other fulcrum point of said member and the depth regulating member, power means operative to swing the crank axle back and forth, and a connection between said crank axle and changeable fulcra member operative to swing the latter about its said other fulcrum point when said crank axle is rocked by the power means.

7. In a tillage implement, a frame, a land wheel, soil working means, a crank axle journaled in the frame and upon which the land wheel is mounted, a power means operative by power derived from said land wheel, a depth adjusting lever pivotally connected to the frame, a link connecting said lever to the power means, means to hold the lever in different positions of its adjustment, furrow wheels, supports for the furrow wheels carried by and movable relatively to the frame, and a lever mechanism including a member having changeable fulcra and also including connections between one of the fulcrum points of said member and the furrow wheel supports and connections between the other fulcrum point of the member and the depth adjusting lever and an arm operated by the crank axle and having pivotal connection with said changeable fulcra member at a point intermediate the fulcrums of the latter.

8. In a tillage implement, a frame, a soil working means, land and furrow wheels, a crank axle upon which the land wheel is mounted, longitudinally movable shafts carried by the furrow wheels and supporting the furrowward side of the frame therefrom, a depth controlling member, means operated by power derived from the land wheel to rock the crank axle, and a lever mechanism connected with the crank axle and with the depth controlling member and with both furrow wheel shafts and operative to raise or lower the latter only when the crank axle is rocked by the power means, said lever mechanism including a member through which raising or lowering movement is communicated to the furrow wheel shafts and which is inoperative with relation to said shafts in the adjustment of the depth controlling member and is operative with relation to the shafts in the operation of the power means.

9. In a tillage implement, a frame, a soil working means, land and furrow wheels, a crank axle upon which the land wheel is mounted, shafts carried by the furrow wheels respectively and mounted to have rotative and longitudinal movements relatively to the frame and to support the furrowward side of the frame from said furrow wheels, an adjustable depth controlling lever, means to hold said lever in its different positions of adjustment, means operated by power derived from the land wheel to rock the crank axle, a link connection between the depth controlling lever and the power means, and a lever mechanism having connection with the crank axle and with the depth controlling lever and with both furrow wheel shafts and operative to raise or lower the latter only when the crank axle is rocked by the power means, said lever mechanism including a member through which raising or lowering movement is communicated to the furrow wheel shafts and which is inoperative with relation to said shafts in the adjustment of the depth controlling lever and is operative with relation to said shafts in the operation of the power means.

10. In a tillage implement, a frame, soil working means carried thereby, a land wheel, a crank axle journaled to the frame upon a horizontal axis and upon which axle the land wheel is mounted, shafts mounted to have longitudinal movement and to rotate about vertical axes relatively to the frame, furrow wheels supporting said shafts, a clutch mechanism whose driving and driven members are operatively related to the land wheel and crank axle, clutch control means, a manually adjustable depth controlling lever, means rigidly connected to the frame to fix the lever to the frame in selected positions of its adjustment, a thrust link whose opposite ends have connection with the driven member of the clutch and with the depth controlling member, respectively, and a lever mechanism having connection with the crank axle and with the depth controlling member and with both furrow wheel shafts and operative to raise or lower said shafts only when the crank axle is rocked by the power means, said lever mechanism including a member through which raising or lowering movement is communicated to said furrow wheel shafts and which is inoperative with relation to said shafts in the adjustment of the depth controlling member and is operative with relation thereto in the operation of the power means.

11. A tillage implement comprising supporting wheels for opposite sides of the implement, respectively, a soil working means, an adjustable depth adjusting member, a power means operated by power derived from one of the supporting wheels, and a lever mechanism having connection with all the wheels and including a member which is operative with relation to all the wheels to cause the soil working means to be raised or lowered bodily when the power means is operated and is inoperative with relation to the wheels at one side of the implement in the depth adjusting operation, to thereby cause the soil working means to be tilted sidewise without changing their height as a whole, in the latter operation.

12. A tillage implement comprising a land wheel supporting the land side of the implement, supporting means for the furrow side of the implement, a soil working member, an adjustable depth adjusting member, connections between the land wheel and the supporting means for the furrow side of the implement operative to transmit movement from said wheel to said means, power means operable at will to operate said connections by power derived from rotation of the land wheel to cause the soil working member to be raised or lowered bodily from or into soil working position, the connections including a member which is operable by said depth adjusting member to move the land wheel without correspondingly moving the supporting means for the furrow side of the implement, to tilt the soil working member variably sidewise toward the land side of the implement and thereby variably regulate the depth of its penetration into the soil.

13. A tillage implement having mechanism actuable by its land wheel to simultaneously raise or lower the landward side and furrowward side of the implement between working and transport positions and also having a setting member operable to determine selectively the depth of penetration of the soil working means of the implement, said mechanism including a changeable fulcra lever which is operable by the setting member to raise or lower the landward side only of the implement and by the rotation of the land wheel to raise or lower both sides of the implement.

14. A tillage implement comprising a land wheel to support its landward side, supporting means for its furrowward side, soil working means and mechanism operable with relation to said land wheel and supporting means to set the soil working means selectively into different sidewise-tilted positions and to raise or lower the same from or into ground working position, including an adjusting member operated to set the soil working means, a land-wheel actuable power means and a lever arranged to be swung about fulcra at its opposite ends by the operation of said adjusting member and power means, respectively, to transmit movement to raise or lower the furrowward side of the implement from the land wheel actuable member and not from the setting member.

15. A tillage implement comprising a soil working member and means to variably determine the depth of furrow produced by said member and to move it between transport and working positions, including land and furrow wheels and connections between the same having a changeable fulcra lever to maintain a normal transport position at different furrow depth adjustments.

16. A tillage implement comprising a soil working member, land and furrow wheels, an adjustable member operative with relation to one of the wheels to adjust the same to variably determine the depth of penetration of the soil working member, a power means driven by one of the wheels, and connections, including a member having changeable fulcra and operatively related to said adjustable member and to the power means and to the wheels to be movable by the adjustable member and power means about its different fulcrums, respectively.

17. A tillage implement having mechanism to raise and lower its tillage elements including land wheel actuable means, a depth means and a transmitting lever common to both of said means, the land wheel actuable means operating to effect a transposition movement to locate the parts selectively in working and transport position, the depth adjusting means being operable to vary the furrow depth adjustment of the tillage elements and the lever common to both of said means having changeable fulcra and being operated about one of its fulcrums in the depth adjusting operation and about its other fulcrum in said transposition movement.

18. A tillage implement comprising a frame, a soil working member carried thereby, a crank axle journaled to the frame, a land wheel mounted upon said axle, substantially vertical shafts mounted to have up and down movement relative to the frame, furrow wheels journaled upon and supporting said shafts, means to rock the crank axle relatively to the frame, including an adjusting member and a holding means therefor, operative to rock the crank axle and hold it in different selected positions, and power means operative at will to rock the crank shaft by power derived from rotation of the land wheel, and a changeable fulcra member having connection with the crank axle and with the adjusting member and with the furrow wheel shafts and when the crank axle is rocked by the adjusting member operating to communicate no movement to raise or lower the furrow wheel shafts and when the crank shaft is rocked by power derived from the land wheel operating to transmit movement which raises or lowers said furrow wheel shafts.

19. A tillage implement comprising a frame, a soil working member fixedly connected to the frame, a land wheel supporting one side of the frame, furrow wheels supporting the other side of the frame, said land wheel being mounted on a crank axle journaled to the frame and said furrow wheels each mounted on a substantially vertical shaft which is mounted to have movement up or down relatively to the frame, and mechanism connected to said crank axle and to the frame and furrow wheel shafts and including elements operative by the operator to rock the crank axle and set it in different selected positions with reference to the frame without moving the furrow wheel shafts up or down relative to said frame, and also including elements operative at will to rock said crank axle and simultaneously move said furrow wheel shafts up or down, relatively to the frame, by power derived from rotation of the land wheel.

20. A tillage implement comprising a soil working member, land and furrow wheels, mountings for said wheels movable in substantially vertical planes, a power means operatively connected to the land wheel mounting to move the same by power derived from the rotation of said wheel, an adjustable depth regulating member also operatively related to the land wheel mounting, and connections between the land and furrow wheel mountings including a member having changeable fulcra, said members operatively related to the depth adjusting member and to the power means and land and furrow wheel mountings to be movable by the depth adjusting member and power means about its fulcra, respectively, and to transmit movement between the wheels only when moved by the power means.

21. A tillage implement having a soil working means, land and furrow wheels, a crank axle upon which the land wheel is mounted, a longitudinally movable shaft carried by the furrow wheel, said shaft also having rotative movement on a substantially vertical axis, power means to rock the crank axle by power derived from rotation of the land wheel, manually operable depth adjusting means operative to rock the crank axle, a longitudinally extensible adjusting means one member of which is connected to the furrow wheel shaft to permit relative movement on a vertical axis between the shaft and adjusting means and to fix the shaft and adjusting means to each other for unitary longitudinal movement and connections between the crank axle and both said adjusting means, operative to cause the raising or lowering of either wheel by the operation of the adjusting means thereof to effect no corresponding change in the position of the other wheel and to cause both wheels to be raised or lowered simultaneously when the crank axle is rocked by the operation of the power means.

22. A tillage implement comprising a soil working member and means to variably determine the depth of furrow produced by said member and to move it between transport and working positions, including land and furrow wheels and connections between the same having a changeable fulcra member to maintain a normal transport position at different furrow depth adjustments and also having relatively adjustable elements operatively related to a furrow wheel and to the changeable fulcra member to adjust the height of said furrow wheel without materially changing the height of the land wheel.

23. A tillage implement having a frame, a land wheel and a furrow wheel, means for effecting simultaneous movement between both wheels and the frame between transport and working positions, including a member having changeable fulcra, and an adjustable member connected to the changeable fulcra member to regulate the position of the land wheel relative to the frame without changing the position of the furrow wheel relative to the frame.

24. A tillage implement comprising land and furrow wheels, a plurality of soil working members each arranged in a vertical plane passing through the points of contact of the furrow wheels with the earth, connections between the land wheel and the furrow wheels operative to raise and lower the soil working members bodily from and into soil working position when power is applied to the land wheel, including a member having changeable fulcra and operable about one of its fulcrums to move the land wheel relatively to the furrow wheels to tilt the soil working members sidewise without substantially changing the height of any of the same as a whole relatively to the ground to thereby variably regulate the depth of penetration of the soil working elements and cause the same to return to substantially the same height above the ground regardless of the adjustment thereof.

In testimony whereof I affix my signature.

CHARLES T. RAY.